United States Patent [19]

Iinuma

[11] Patent Number: 4,879,464
[45] Date of Patent: Nov. 7, 1989

[54] RADIATION IMAGING APPARATUS

[75] Inventor: Kazuhiro Iinuma, Tochigi, Japan

[73] Assignee: Kabushiki Kaisha Toshiba, Kawasaki, Japan

[21] Appl. No.: 14,201

[22] Filed: Feb. 5, 1987

Related U.S. Application Data

[63] Continuation of Ser. No. 641,574, Aug. 16, 1984, abandoned.

[30] Foreign Application Priority Data

Aug. 19, 1983 [JP] Japan .................................. 58-150987
Nov. 24, 1983 [JP] Japan ...................................... 220983

[51] Int. Cl.$^4$ ............................................. G01T 1/208
[52] U.S. Cl. ............................ 250/361 R; 250/363.02; 250/370.10
[58] Field of Search .......... 250/361 R, 363.02, 363.06, 250/366, 369, 370.10

[56] References Cited

U.S. PATENT DOCUMENTS

| | | | |
|---|---|---|---|
| 4,070,578 | 1/1978 | Timothy et al. | 250/370 G X |
| 4,115,694 | 9/1978 | Lange et al. | 250/369 |
| 4,220,863 | 9/1980 | McBride et al. | 250/369 |
| 4,223,388 | 9/1980 | Nishikawa et al. | 250/369 |
| 4,245,158 | 1/1981 | Burstein et al. | 250/370 G X |
| 4,274,002 | 6/1981 | Tomita | 250/369 |
| 4,415,807 | 11/1983 | Freauf et al. | 250/369 |

Primary Examiner—Janice A. Howell
Assistant Examiner—Richard Honig
Attorney, Agent, or Firm—Finnegan, Henderson, Farabow, Garrett and Dunner

[57] ABSTRACT

A plurality of semiconductor radiation detector elements are arranged in a matrix array. The same number of signal process circuits as the detector elements are exclusively connected to the respective detector elements. The detector signals derived from the individual detector elements are independently stored in predetermined memory cells of a frame memory. Further, a coding circuit is connected between the signal process circuits and the frame memory.

24 Claims, 9 Drawing Sheets

DETECTOR

RADIATION IMAGING APPARATUS

This application is a continuation, of application Ser. No. 641,574, filed Aug. 16, 1984, now abandoned.

BACKGROUND OF THE INVENTION

1. Field of the Invention:

This invention relates to an apparatus for detecting radiation containing medical information from an object under examination in a two-dimensional plane and for producing a two-dimensional image of the object as the medical information.

2. Description of the Prior Art:

A scintillation camera is a practical available radiation imaging apparatus.

The Anger type scintillation camera as the most typical scintillation camera is known. See, for example U.S. Pat. No. 3,011,057 to Anger issued on Nov. 28, 1961. The principle operation of the Anger type scintillation camera is as follows. A scintillator made of NaI(Tl) crystal is arranged to receive an amount of radiation which is administered to the object, e.g., a patient. Due to the scintillation phenomenon, the scintillator emits light (fluorescent emission) from the part (position) of the scintillator in which the radiation, e.g., γ-rays (gamma-rays) are incident.

In general, several tens of photomultiplier tubes, for example, 30 to 90 two-inch photomultiplier tubes, are positioned to receive the scintillation light derived from the scintillator. These tubes are arranged in a two-dimensional plane. The position of the fluorescent emission in the scintillator is discriminated by proportionally calculating the amount of the detected light of the photomultiplier tubes. While these fluorescent emissions are counted by photon counters, the detection operation by the photomultiplier tubes continues until the counting results reach the predetermined values. As a result, two items of data are obtained for the scintillation emission position in the two-dimensional plane and for the intensity distribution of the γ-rays. The two-dimensional image is displayed in accordance with those data, so that a medical diagnosis can be made by observing the distribution image of the radioisotope administered to the patient.

In accordance with the above-described conventional system, an image consisting of 256×256 pixels is constructed by processing the signal which is obtained from 64 pieces of the photomultiplier tubes. The system provides poor spatial resolution and requires correction to obtain a homogeneous quality of the image. Due to its inherent operation, i.e., the proportional calculation cannot be executed if more than two photons of γ-rays are simultaneously incident on the entire reception field of the scintillation camera. Accordingly, the counting efficiency of the γ-rays is extremely deteriorated, and the total detection time is increased, resulting in a lengthy diagnosis.

As is known in the art, the γ-ray incident upon the scintillator usually contains the scattered rays which are unnecessary for measurement. These scattered rays have a lower energy level than primary rays. Accordingly, the conventional system eliminates the scattered rays by utilizing energy analysis, e.g., a pulse-height selector, or analyzer. However, the energy analyzing capability depends on the number of visual photons that contribute to the total detection currents of the photomultiplier tubes.

In the Anger type scintillation camera, there are the drawbacks of the energy conversion efficiency of the scintillator, the photon collection efficiency, conversion efficiency, and the energy resolution of the photomultiplier tube. Moreover, since the photomultiplier tube is employed, the total weight of the detector assembly, including the scintillator and the photomultiplier tubes, becomes too great. The heavy camera causes a more serious problem in emission computer tomography in which the camera assembly is required to be rotated around the object. In addition, since the measurement is carried out to calculate the detection currents that are derived from a plurality of photomultiplier tubes, the detection characteristics of the photomultiplier tubes must be accurately corrected, resulting in a high manufacturing cost and cumbersome maintenance.

It is therefore an object of the present invention to avoid the above conventional drawbacks, and to provide a radiation imaging apparatus with improved radiation counting characteristics and spatial and energy resolutions.

Another object of the present invention is to realize homogeneous image quality without any adjustment of the apparatus.

Still another object of the present invention is to provide a radiation imaging apparatus useful in, especially, the field of nuclear medical diagnosis, with which a compact and lower cost two-dimensional radiation detector can be made without requiring cumbersome maintenance.

SUMMARY OF THE INVENTION

These objects may be accomplished by providing a radiation imaging apparatus comprising:
- a transducer including a plurality of detector elements for detecting as electric impulses radiation irradiated from an object under investigation to which a radioactive substance has been administered, the plurality of detector elements being arranged in a matrix array, whereby the electric impulses are exclusively derived from the detector elements allocated in accordance with the matrix array;
- a signal processor including a plurality of signal process circuits for processing the electric impulses so as to only produce pulse signals having a predetermined signal level, the pulse signals being exclusively derived from the corresponding signal process circuits allocated in accordance with the matrix array;
- a first memory for temporarily storing the pulse signals having a predetermined signal level within a predetermined time period in predetermined first memory positions allocated in accordance with the matrix array;
- a second memory for storing a plurality of pulse signals of the first memory in corresponding second memory positions allocated in accordance with the matrix array, whereby an image data signal of the object is produced; and
- a monitor for displaying a distribution map of radiation based upon the image data signal.

BRIEF DESCRIPTION OF THE DRAWINGS

These and other objects and features of the invention will become apparent with reference to the following specification and to the drawings in which.

DETAILED DESCRIPTION OF THE PREFERRED EMBODIMENT

Before proceeding with a description of the various preferred embodiments, a basic idea of the radiation imaging apparatus according to the present invention will now be described with reference to FIG. 1.

Figure 1:
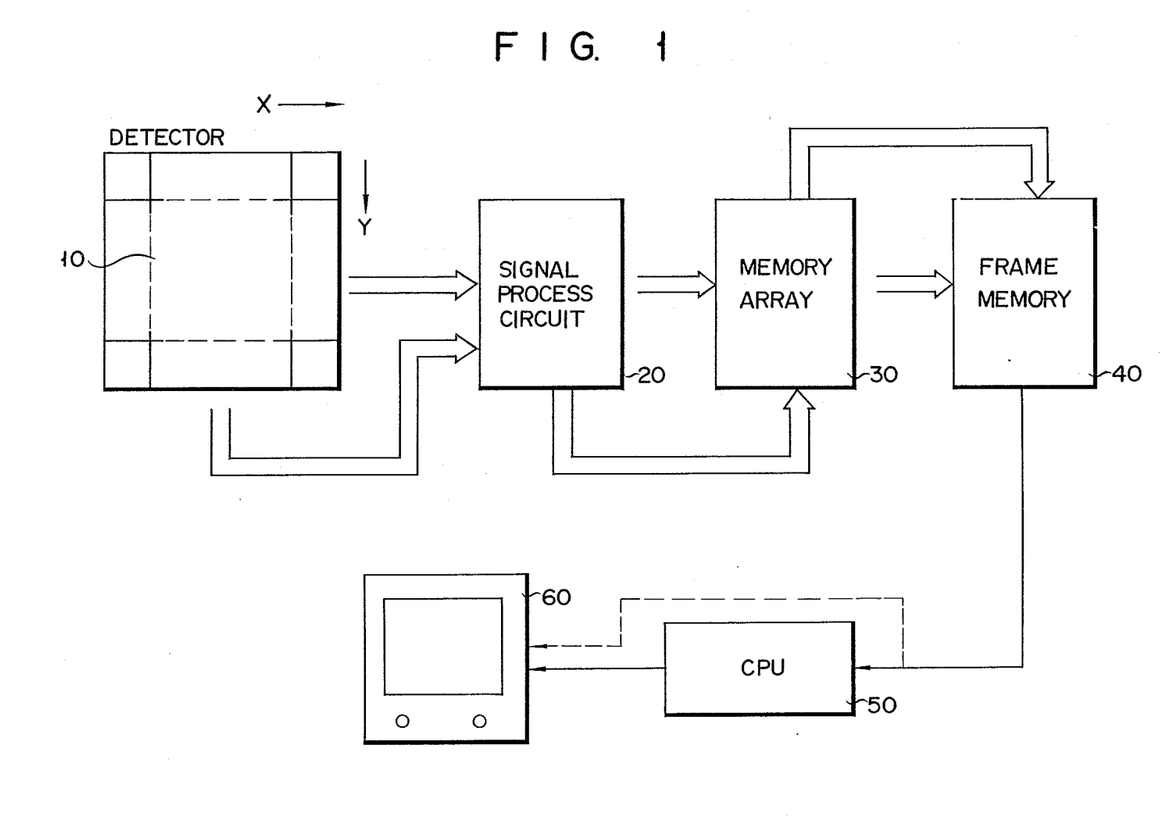
FIG. 1 is a block diagram of a radiation imaging apparatus according to a first embodiment.

FIG. 1 shows a block diagram of an entire system of an imaging apparatus according to the basic idea.

A radiation detector 10 is provided with the imaging apparatus. The detector 10 has semiconductor radiation detector elements (not shown in detail) arranged in a matrix array. For example, 256×256 elements are provided along the rows and columns, so the 65,536 elements are employed in total. As is known in the art, each individual element is arranged in a collimator for collimating the incident radiations, so that only the radiation, e.g., γ-rays (gamma rays) which has been incident upon the reception plane of the elements at a right angle can be efficiently detected by the elements.

The radiation detected by the detector 10 is converted into electric impulses, the energy level of which corresponds to that of the radiation. These electric impulses are supplied to a signal process circuit 20. The circuit 20 amplifies the electric impulses and analyzes their pulse height. In this case, the coupling between the detector 10 and the signal process circuit 20 is so designed that the respective detection signals (impulse signals) of the above 65,536 detector elements can have the own spatial information of the two-dimensional array, i.e., the matrix array. That is, in this detector, 256 detector elements are aligned along the X-direction (horizontal direction) and 256 detector elements are aligned along the Y-direction (vertical direction), resulting in 65,536 elements in total. Accordingly in order to maintain such a spatial (positional) correlation, 65,536 preamplifiers are arranged in the signal process circuit 20 in such a manner that the respective preamplifiers are exclusively connected to the corresponding detector elements. In other words, these preamplifiers are allocated to be connected to the detector elements in accordance with the matrix array. Consequently, the position in the matrix array where radiation is incident can be recognized by the detection signal to which no extra code information that may indicate such a spatial correlation has been added.

The signals derived from the signal process circuit 20 are temporarily stored in a memory array 30. Because the detection signals occur intermittently, the memory array need acquire these detection signals in a predetermined period, thereby obtaining the signal distribution map. The internal memory arrangement of the array 30 is similar to the circuit arrangement of the process circuit 20. For example, it may be constructed by a random access memory (RAM) having 65,536 memory positions which are arranged in a 256×256 matrix array.

The signals acquired during the given period by the memory array 30 are fed to a frame memory 40. In this frame memory, 256×256 storages, or memory cells are aligned in the X- and Y- directions in a matrix array. The individual memory cells are exclusively connected to the respective 65,536 memory positions of the memory array 30 while maintaining the above-described spatial relationship. The signals which are stored in the given memory cells are then processed by the predetermined signal processing ways to form the desirable image data.

The resultant image data may be directly supplied to a display device 60, or may be fed to a central processing unit (CPU) 50 in which additional processing is performed prior to it being supplied to the display device 60.

As has been mentioned, 256×256 semiconductor radiation detector elements are aligned in the X- and Y-directions to form a matrix array. Since those detector elements are exclusively connected to the respective internal circuit elements of the signal process circuit 20, memory array 30 and frame memory 40, e.g., the memory cells of the frame memory 40 while maintaining the positional correlation, it can be seen that the detection signals derived from the respective detector elements contain their own spatial data, even if a signal indicating the spatial data is not additionally superimposed thereto.

Alternatively it is possible to substitute both the memory array 30 and the frame memory 40 with a single memory having the same functions as memories 30 and 40.

The fundamental arrangement of the first embodiment has the following advantages over the conventional radiation imaging apparatus.

(1) In the conventional system employing a plurality of detectors and photomultiplier tubes, the proportional calculation is carried out to discriminate the incident positions of the radiation by using a resistor matrix means or the like. Consequently, when more than two types of radiation are incident the entire reception area of the scintillation camera at the same instant, the spatial discrimination accuracy is extremely deteriorated.

In contrast, the spatial discrimination accuracy (resolution) and the counting efficiency can be improved in the present detector. In the first place, the reception region of a detector element is considerably smaller than that of the photomultiplier tube, and in the second place no proportional calculation is required.

(2) The radiation reception area and the size of the semiconductor element are considerably smaller than that of the conventional detector element, i.e., a combination of the scintillator and the photomultiplier tube. As a result, since the detector channels can be arranged at a higher density, spatial discrimination can be greatly improved.

(3) By utilizing the current semiconductor manufacturing technology, homogeneous characteristics of the detector elements can be realized, as compared with that of the conventional photomultiplier tubes. As a result, no correction is required to obtain a homogeneous image quality.

(4) As another advantage, a compact and light detector, i.e., the imaging apparatus, can be realized.

Although the arrangement of the detector elements and the wiring connection between a number of the detector elements and the corresponding circuit elements, or between the storage cells, seems to be rather complex and cumbersome, those difficulties may be solved by introducing the recent high technology in the semiconductor manufacturing technical field and also the other relevant technical fields.

Referring to FIGS. 2 to 6, a second embodiment according to the present invention will be described.

The main feature of the second embodiment may be summarized as follows. To improve the manufacturing efficiency of the detector 10 and the signal process circuit 20, detection blocks and coding circuits have been newly introduced.

Figure 2A:
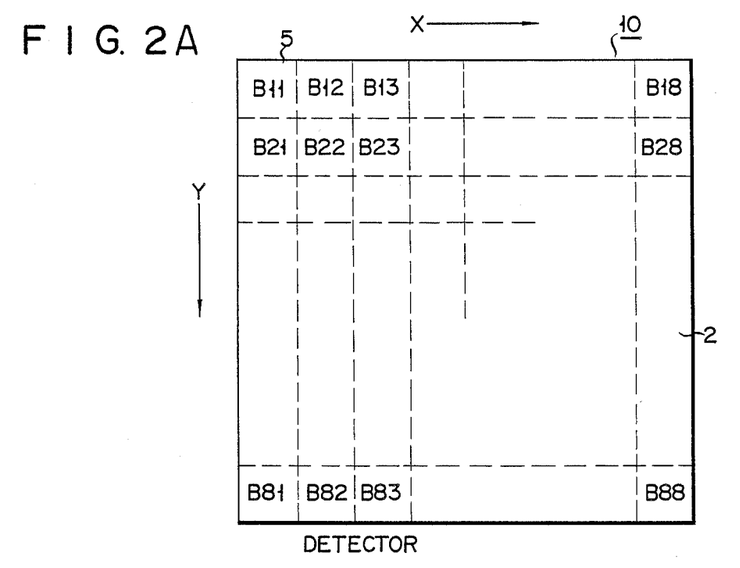
FIG. 2A is an illustration of a radiation detector and FIG. 2B is an illustration of the apparatus according to a second embodiment.

FIG. 2A schematically shows a front view of the detector array 2 of the detector 10 without the collimator array 6. As previously described, 256×256 detector elements (channels) are aligned in a two-dimensional array 2 (matrix arrangement). This array 2 is a square having sizes of 512 mm×512 mm. In this embodiment, the detector channels are equally divided into 64 blocks 5. Accordingly, one block 5 is composed of 1,024 detector elements (channels) 3, which is denoted by B11, B12 ... B88 respectively.

Figure 2B:
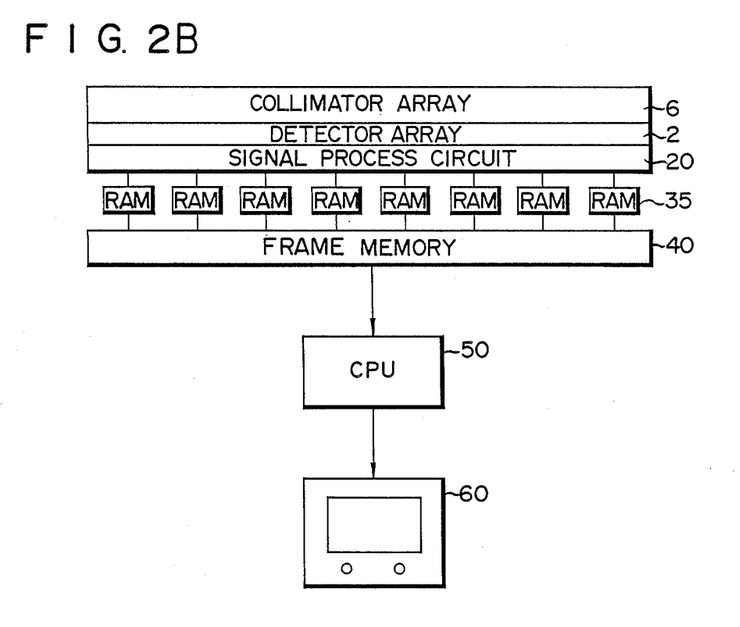

As seen from FIG. 2B, the collimator array 6 is mounted in front of the detector array 2 (details will be explained later). The detector channel blocks 5 are individually connected to the signal process circuit 20. The signal process circuit 20 mainly consists of preamplifiers, pulse-height analyzers and coding circuits (as will be explained later). A combination of a preamplifier, a pulse-height analyzer and a coding circuit is connected to a corresponding detector channel block 5, e.g., B11.

Each of those channel blocks 5 is connected to a Ram 35 of the memory array 30. Each of the RAM's 35 is further connected to a corresponding memory cell of the frame memory 40. The frame memory 40 is connected to the display device 60 through the CPU 50.

Figure 3A:
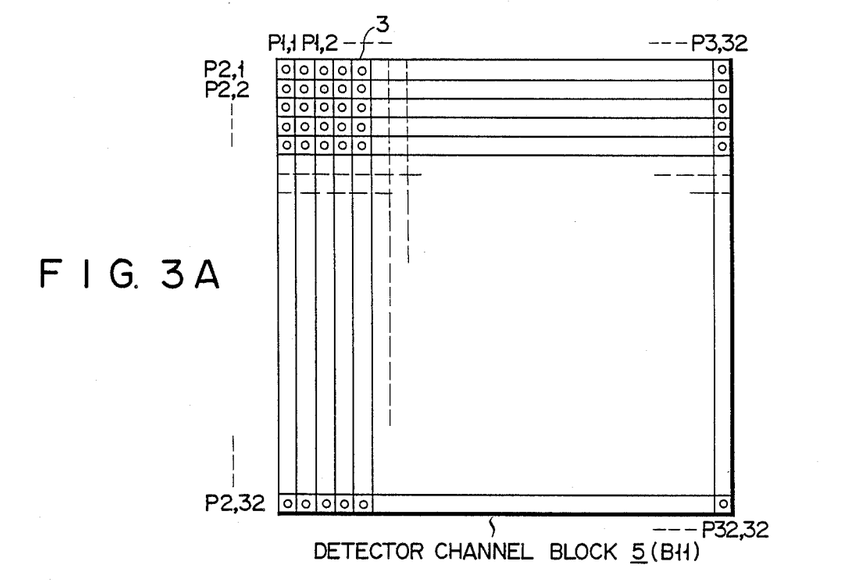
FIG. 3A is a plan view of one detector block of the detector shown in FIG. 2A.
Figure 3B:
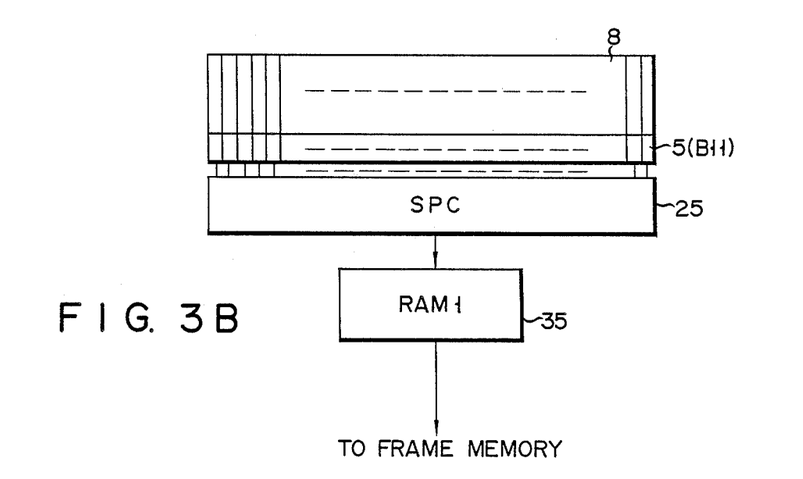
FIG. 3B is an illustration of one detector block and its relevant circuits shown in FIG. 3A.

Referring to FIG. 3A, one detector channel block 5, e.g., B11, consists of 32×32 (1,024) detector elements 3, which are indicated by references P1,1; P2,1; P1,2 ... P32,32 respectively. This block 5 is a square. As previously described, the block 5 (B11) is connected to a circuit section 25 of the signal process circuit 20 and thereafter to one of the RAM's 35 of the memory array 30. 1,024 collimators 8 of the collimator array 6 are mounted on the detector channel elements 3 of the detector channel block 5 in predetermined combinations (see FIG. 3B).

Figure 4:
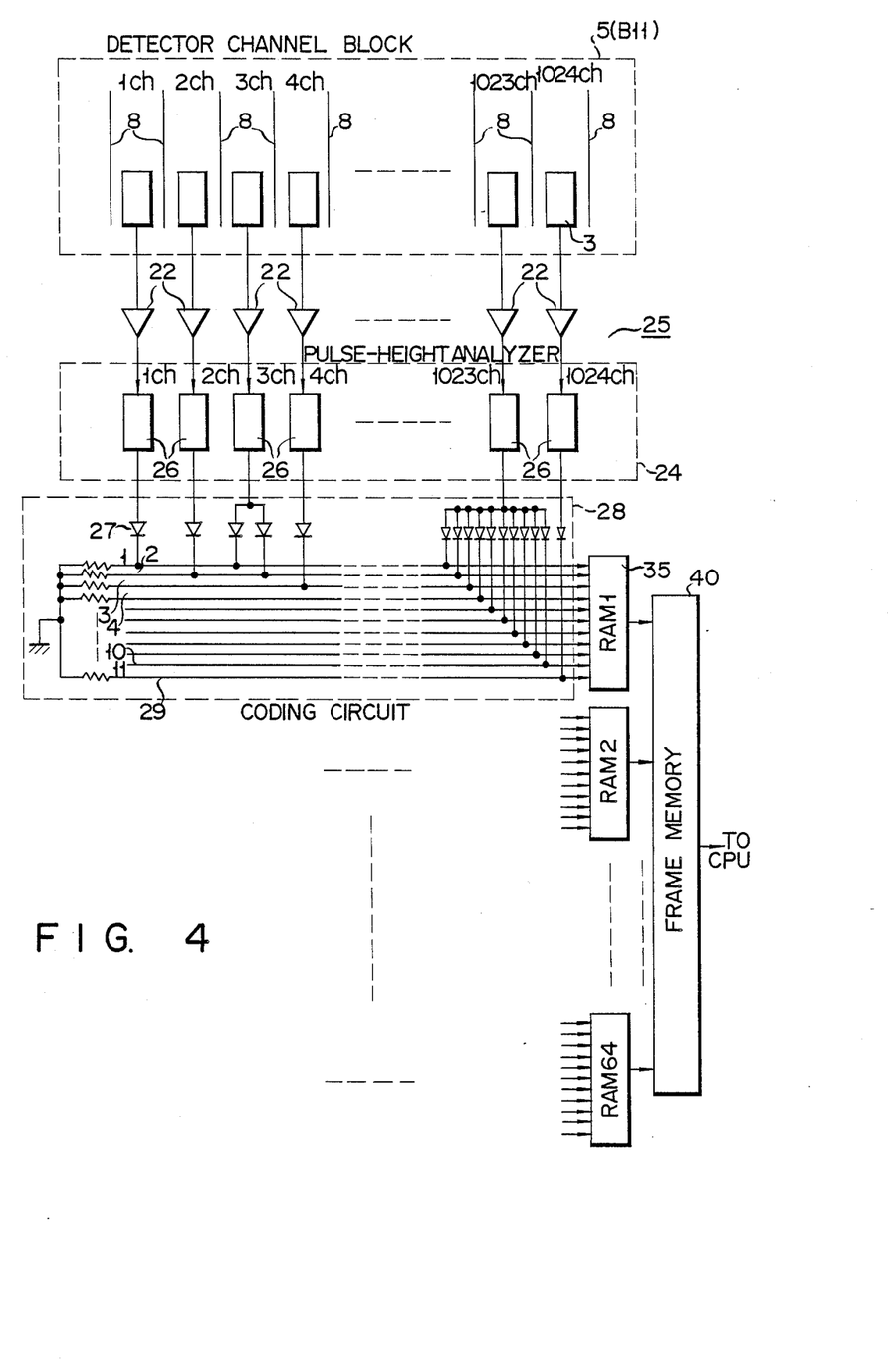
FIG. 4 is a schematic diagram of one detector block and its relevant circuits according to the second embodiment.

Referring to FIG. 4, the circuit section 25 of the signal process circuit 20 will now be described in detail.

The detection signal derived from the 1024th channel is supplied via a preamplifier 22 to the 1,024th pulse-height analyzer section 26 of the pulse-height analyzer 24. The analysis signal derived from the 1,024th pulse-height analyzer section 26 is supplied to the coding circuit 28. In this coding circuit 28, the 1,024 detection signals are finally coded into 11 detection signals in which the spatial (positional) correlation information of each detection signal and the existence of the incident photon can be coded in an 11 bit form. A detailed description of the coding circuit 28 will be made later. The coded signal is supplied to the relative RAM's 35 and thereafter to the frame memory 40. It should be noted that one detector block 5 and one pulse height analyzer 25 have 1,024 detector channel elements and also 1,024 analyzer sections in total respectively, and for instance, the first channel element 3 is independently connected to the first analyzer section 26. Since the coding circuit 28 is provided, only 64 RAM's can cover all detection signals derived from the 65,536 detection channels of the entire detector array 2.

Figure 5:
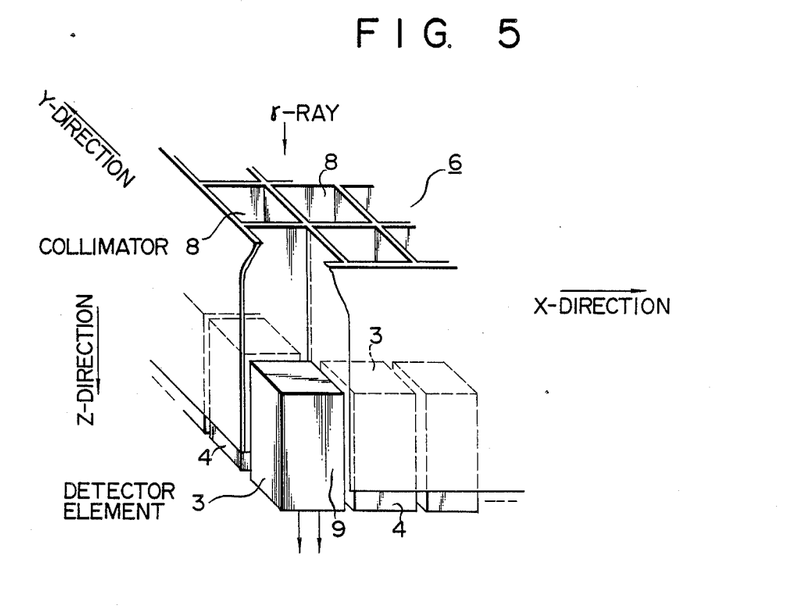
FIG. 5 shows an enlarged perspective view of detector elements and collimators.

Referring to FIG. 5, a description will be made of the collimator array 6. As previously explained, the individual collimator 8 of the collimator array 6 is mounted on the respective detector (channel) elements 3. The collimator 8 is made from a lead plate in the form of a grid. The length is approximately 20 mm in the Z-direction, thickness is approximately 0.1 mm, and the pitch is approximately 2 mm. As seen from FIG. 5, the collimator 8 is constructed in the form of a square frame.

It is understood that the number of the collimators 8 of the collimator array 6 is equal to that of the detector elements 3, i.e., 65,536.

The semiconductor radiation detector element 3 such as GaAs and CdTe is buried in the lower portion (hole) of the grid. Gamma rays incident upon the upper portion (hole) of the collimators 8 are absorbed by the respective semiconductor detector elements 3 to produce electron-hole pairs and then to derive them as a detection current. The detection current has a value proportional to the photon energy of the γ-rays. The detection current is converted and amplified by a preamplifier 22 of the circuit section of the signal process circuit 20. Thereafter the detection voltage is analyzed by pulse-height analyzer elements 26 (will be described later).

In the collimator embodiment shown in FIG. 5, it is sufficient for the purpose of γ-ray detection to employ a semiconductor detector element approximately 3 mm in length if the direct conversion type semiconductor element such as CdTe is used. In other words, if the silicon scintillator is employed, a length of approximately 5 cm is required to obtain the same energy conversion efficiency as in the former element.

As seen from FIG. 5, the end portion 4 of the detector element 3 projects slightly from the bottom portion 9 of the collimator 8 in the Z-direction. This arrangement provides the following merit. That is, in general, the length of the collimator must be designed to be long enough to absorb the scattered γ-rays. Further, the longer the detector element, the greater the conversion efficiency of the γ-rays.

However, if the length of the collimator 8 is made long in the Z-direction, the total weight of the collimator array 6 becomes rather heavy, resulting in a loss of the features of the present invention. To avoid such contradictory requirements, the arrangement of FIG. 5 can be satisfied to eliminate the scattered rays with greater efficiency and also to improve the conversion efficiency.

Figure 6:
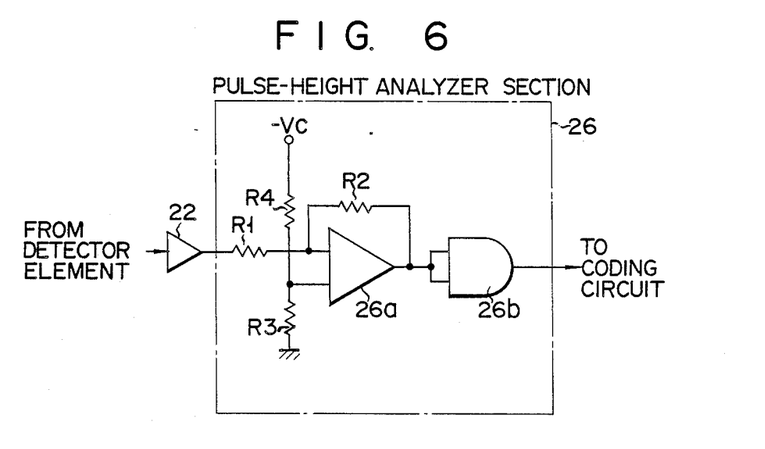
FIG. 6 is a circuit diagram of a pulse-height analyzer section.

FIG. 6 shows a circuit diagram of the pulse-height analyzer section 26 of the pulse-height analyzer 24. Resistors R1, R2, R3 and R4 are provided with an operational amplifier 26a. An AND gate 26b is coupled between the output stage of the analyzer section 26 and the operational amplifier 26a. A supply voltage $-V_c$ is applied to the resistor 4.

When the γ-ray photon impinges on the detector element 3 coupled to the corresponding analyzer section 26, a negative pulse voltage is produced by the preamplifier 22 (referred to simply as an "amplifier"). This negative pulse voltage is then applied as an input voltage to the pulse-height analyzer section 26. Precisely, the pulse voltage is applied via the input resistor R1 to one input terminal of the operational amplifier 26a, while $-R3\cdot Vc/(R3+R4)$ voltage is being applied to another input terminal of the operational amplifier 26a. When the input pulse voltage exceeds the above threshold level $R3\cdot Vc/(R3+R4)$ in its absolute value, a positive pulse is output from the operational amplifier 26a to the AND gate 26b. Accordingly, the output of the pulse-height analyzer section 26 can be selected to be either a logic level "1" or "0" by adjusting the supply voltage "$-Vc$". For example, when the detection current caused by one photon of a γ-ray exceeds a predetermined level, the logic level "1" is derived from the analyzer section 26. The AND gate 26 a functions as a buffer. As previously described, the above operation can be independently carried out in each of the 1,024 detection channels. The signals of the entire pulse-height analyzer 24 are obtained in the same manner. These signals are then supplied to the coding circuit 28 where they are coded (will be described later in detail).

The coding circuit 28 is shown in FIG. 4. The outputs of the pulse-height analyzer sections 26 forming 1,024 channels are connected through diodes 27 to eleven (11) lines 29. This coding circuit 28 operates as follows. When no γ-ray is incident upon any of the detection channels (the detector elements), all outputs of the eleven lines 29 become a logic level "0" respectively, because all of the outputs of the pulse-height analyzer sections 26 are "0" respectively. If the γ-ray which is not the scattered ray, but the primary ray is incident on the detector element of the first channel, only the first pulse-height analyzer section belonging to the first channel will output the logic level "1", so that the output of the first line 29 becomes "1" and that of the remaining lines 29 becomes "0". As a result the outputs of the line 29 of the coding circuit 28 are "00000000001" in the logic form. When the γ-ray is incident upon the fourth channel, the outputs of the coding circuit 28 become "00000000010", and when upon the 1023rd channel, they become "01111111111". Accordingly, the coded outputs directly indicate the position of the detector element (channel) upon which the γ-ray is incident.

As is easily understood from the foregoing, 1,024 detection signals of one detector block 5 are coded in the coding circuit 28 so that only eleven coded signals can represent the 1,024 detection signals. As a result, the entire circuit of the imaging apparatus can be made more compact, and the incident γ-ray position can be simultaneously detected without any calculation.

When the scattered γ-rays are incident, the pulse-height analyzer 24 does not output its detection signal, because the energy level of the scattered γ-ray is lower than that of the primary γ-ray. As a result since no input signal (pulse signal) is supplied to the coding circuit 28, the above-mentioned no signal code "00000000000" is derived therefrom. As previously explained, when one γ-ray is incident on the detector channel of each detector channel block 5, the incident position thereof can be converted by the coded signal having 10 bits by the coding signal 28. Furthermore one bit is added to this 10bit signal to determine the address of the RAM's 35. Then an 11-bit coded signal is derived from the coding circuit 24.

As the γ-rays are subsequently incident upon the detector channel blocks, "1" bit is added to the address of the corresponding RAM's 35 in turn, so that the photon information of the incident γ-ray is stored into the address of the RAM's 35. In correspondence with the respective channel blocks'5 (B11 through B88), one RAM 15 is connected thereto. Accordingly, the distribution of the photon numbers is stored in the respective RAM1 to RAM64. The photon distribution stored in the respective RAM's 35 are transferred to the frame memory 40 which has an addressing capability (16 bits) for the entire detector elements (65,536 elements) and holds the image signal (two-dimensional image information). The two-dimensional image information of the γ-rays stored in the frame memory 40 is either directly sent to the display device 60, or is sent via the CPU 60 where the necessary image processing is given.

As already described, each of the 64 detector channel blocks (B11 to B88) can be independently operated, i.e., the individual coding circuits 28 can be independently operated. Although upon recepit of more than two γ-rays simultaneously in one detector block, the corresponding coding circuit is made inoperative, a plurality of coding circuits can be independently operated even if a plurality of γ-rays is simultaneously incident upon those blocks, e.g., B12, B23 and B88.

In the conventional Anger type scintillation camera, the incident positions of the γ-rays are calculated from the detection signals of a plurality of photomultiplier tubes which is disposed behind the scintillator. As a result, when more than two γ-rays are simultaneously incident upon the entire detector region, an accurate calculation cannot be inherently done. In contrast, according to the second embodiment, the entire detector 10 is electrically divided into, for example, 64 detector channel blocks, each of which can be independently operated. Furthermore as the individual detector channel blocks can have, e.g., 1,024 channels, 1,024 position descriminations are possible. Consequently the counting characteristics according to the present invention can be improved by 64 times over the Anger type scintillation camera.

In addition to the above advantage, since the incident position can be excusively determined by the coding circuit 28, the incident position of the γ-ray can be instantaneously determined because no position calculation is carried out. The greater the photon numbers become, the greater the energy resolution will be improved.

In the conventional Anger camera, there are serious drawbacks in the energy conversion efficiency at the scintillator, the light collection efficiency at the photomultiplier tubes, and the photon-electron conversion efficiency (quantization efficiency) at the photomultiplier tubes. However, in accordance with the present invention, all these drawbacks can be solved by the direct conversion type detector element and furthermore the energy discrimination can be considerably improved.

In accordance with the principle of the present invention, it is also possible to employ various types of photodetectors instead of the direct conversion type detector elements, e.g., GaAs, because the photodetector need not employ a large crystal such as NaI. As a result, a higher photoconversion efficiency can be achieved.

Figure 7:
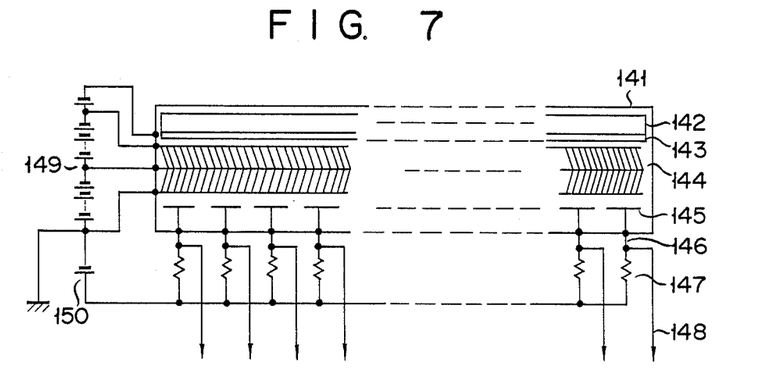
FIGS. 7, 8 and 9 show illustrations of the radiation detectors.

FIG. 7 shows a first example where the known multi-channel plate 144 is employed in combination with a radiation-photon conversion scintillator 142. This multi-channel plate 144 has its own the position resolution and can multiply incident electrons. The scintillator 142 is mounted in a vacuum chamber 141. Behind the photocathode plate 143, the multi-channel plate 144 is positioned. When a γ-ray is incident upon the vacuum chamber 141, it is converted into a photon and thereafter this photon is converted into an electron. Then the electron is multiplied by the multi-channel plate 144, and the multiplied electron is collected by an anode 145 positioned at the back side of the multi-channel plate 144. This electron is derived as a current from a lead electrode 146 which is hermetically sealed in the vacuum chamber 141. This current flows through a resistor 147 and is supplied via a lead wire 148 to the preamplifier 22 of the signal process circuit 20 (FIG. 4). In this detector assembly, the anodes 145 and the lead electrodes 146 are arranged in the two-dimensional plane that corresponds to the matrix array of the above-mentioned detector elements. In accordance with the detector arrangement, the photodetection signal corresponding to the energy of the incident γ-ray can be multiplied, so that the energy resolution can be improved. In FIG. 7, a high voltage power supply 149 and a low voltage power supply 150 are connected to the multi-channel plate 144 and to the resistor 147 respectively so that the electron can be accelated and multiplied at the high voltage, and so the signal current can flow through the resistor 147.

Figure 8:
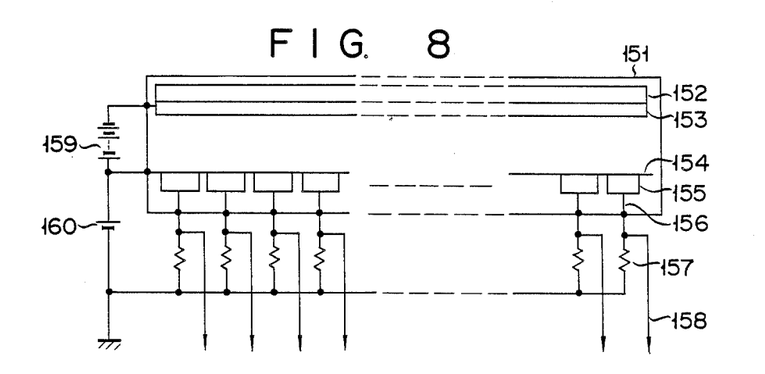

FIG. 8 shows a second example where a scintillator 152 is mounted in a vacuum chamber 151, a photo-cathode plane 153 is positioned behind the scintillator 152, and the photocathode plane 153 is received by a semiconductor detector element 155. An electrode 154 is disposed at a given distance from the photocathode plane 153. A terminal of the semiconductor detector element 155 is conducted while being hermetically sealed from the vacuum chamber 151. When a γ-ray is incident upon the scintillator 152, a fluorescent emission (scintillation) occurs at the incident position of the scintillator 152.

Electrons are projected from the photocathode plane 153 and then is accelerated by the high voltage field produced by a high voltage power supply 159 between the electrode 154 and the photocathode plane 153. After this acceleration, accelerated light is incident upon the detector element 155, in which an electron-hole pair is produced. Thus the pair is derived from a lead wire 156 as a current. This current flows through a resistor 157 to an output terminal 158 as an output voltage. In accordance with this example, since the accelerated electrons impinge upon the semiconductor detector element 155 with high energy, element 155 can provide an amplification effect.

Figure 9:
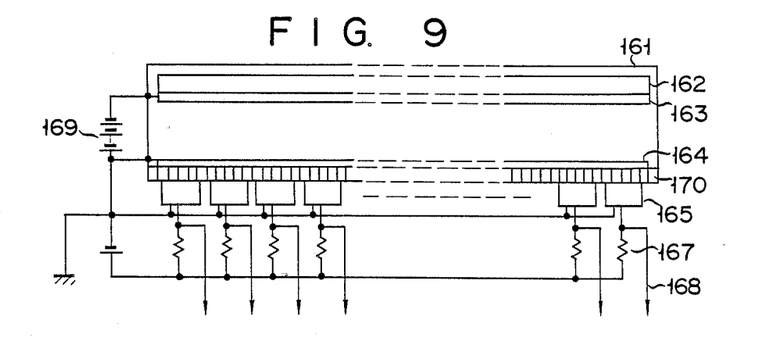

FIG. 9 shows a third example, which is similar to that of FIG. 8 except that the accelerated electron is not directly incident on the semiconductor element, but impinges a fluorescent material 164 to emit light. The emitted light strikes photodiodes 165 via a transparent plate 170 consisting of a plurality of optical fibers. The photodiodes 165 are arranged outside the vacuum chamber 161. This transparent plate 170 causes the emitted light to be directly incident upon the photodiodes 165 without any scattering. This plate 170 functions as a part of the vacuum chamber 161. An output voltage is derived from an output terminal 168 of the photodiodes 165 through a resistor 167.

As already described in detail, a huge number of radiation detector elements, e.g., 65,536 are electrically divided into a very small number of detector channel blocks for example 64 (B11, B12 ... B88) in accordance with the second embodiment. As a result, only eleven (11) signal lines are needed to code the 65,536 detection signals for each detector channel block. In total, only 16 signal lines can be employed to obtain 16-bit addresses. Accordingly, the coding circuit 25 can be constructed to be very simple, so that it can be very easily connected to the two-dimensional detector array 2. Such circuit simplification can be realized in the coding circuit 28.

As a result, the amplifiers 22 and the pulse-height analyzer sections 26 need the same number of circuit elements as that of the detector elements i.e., 65,536. However, such complex circuit arrangements can be easily realized by introducing the recent semiconductor technology, for instance, Large Scale Integrated technology, resulting in a circuit that is compact, highly reliable and which has a low cost.

Figure 10A:
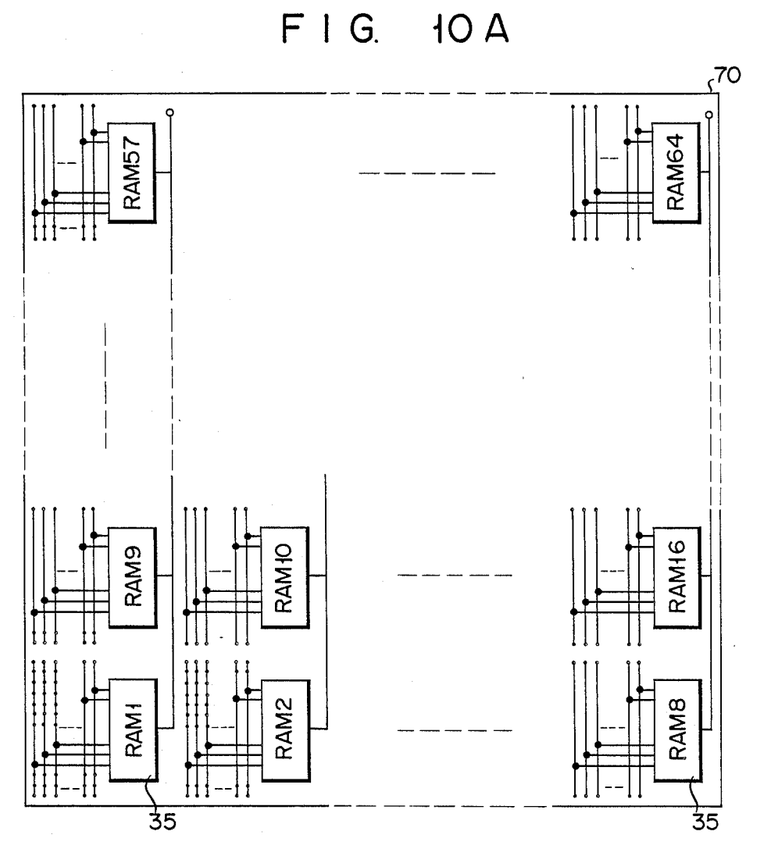
FIG. 10A is a plan of a printed circuit board to which RAM's are connected.
Figure 10B:
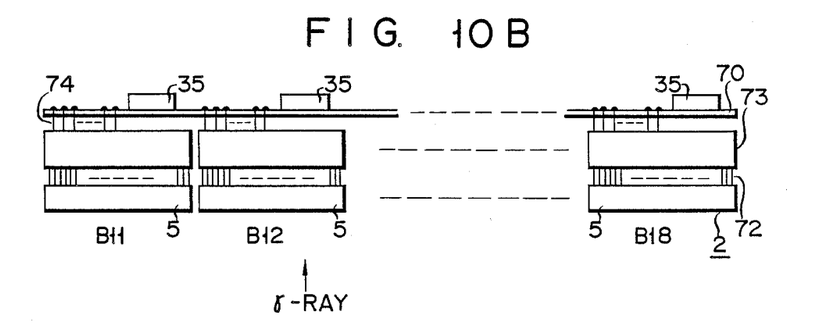
FIG. 10B is a side view of the circuit board shown in FIG. 10A.

FIGS. 10A and 10B show a printed circuit board 70 on which those large scale integrated circuits are mounted. As seen in FIG. 10B, 1,024 (32×32) output terminals 72 are led from one detector channel block, e.g., B11. In this case, sixteen (16) pairs of the output terminals 72 are made, one pair including 64 output terminals. The amplifiers 22, the pulse-height analyzer sections 26, and the coding circuit 28 are manufactured in an IC (integrated circuit), and are then stored in an IC package 73. Accordingly, the IC package 72 has only eleven signal lines 73, whose pins (line pins) including power lines and ground lines are connected to the printed circuit board 70. Those pins are commonly used in sixteen (16) IC packages 73, so that they are commonly connected to the RAM's 35. The above-described circuit arrangement can be utilized in the remaining detector blocks 5. The outputs of the RAM's 35 of the respective detector blocks 5 are supplied through the line printed on the circuit board 70 to the frame memory 40.

Figure 11:
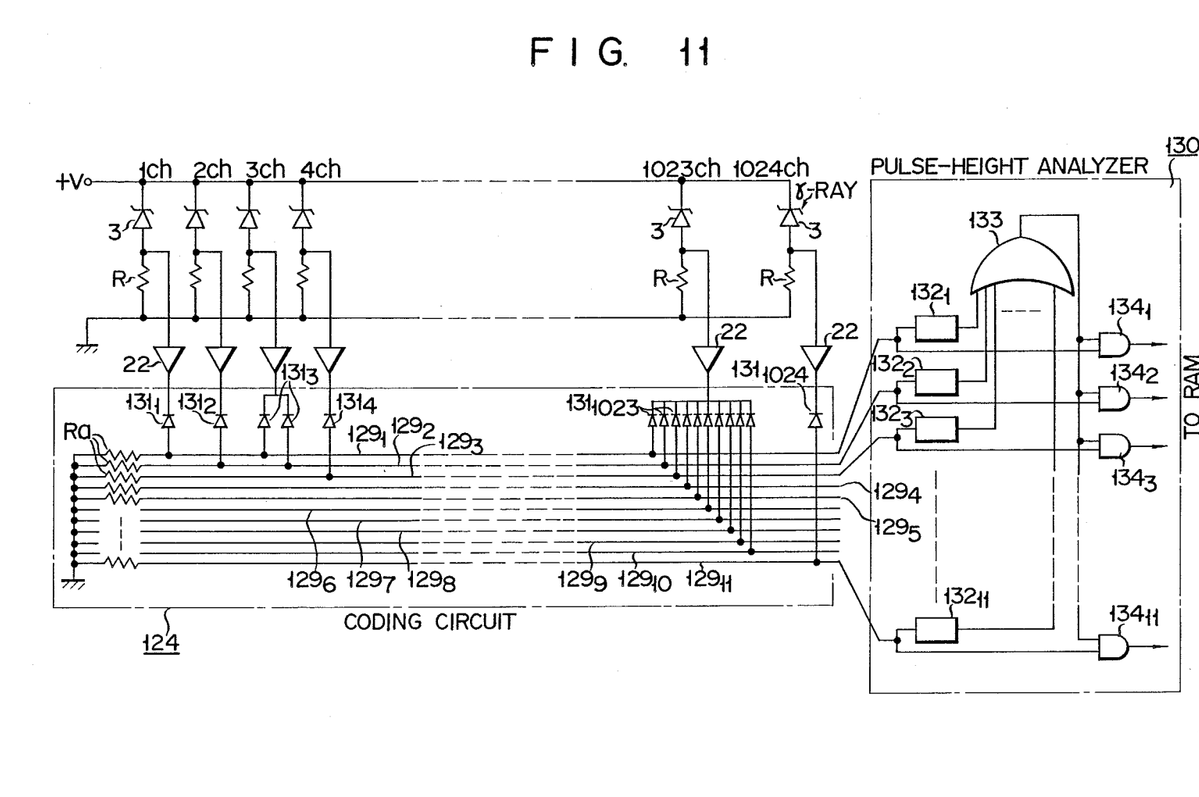
FIG. 11 shows a circuit diagram according to a third embodiment.

FIG. 11 shows a major circuit of the third embodiment. In this embodiment, the circuitry arrangement can be further simplified.

It should be noted that the same reference numerals shown in FIG. 4 will be employed as those denoting the same circuit elements shown in FIG. 11.

1ch, 2ch ... 1,024ch indicate the detector channels of detector blocks 5. Reference numeral 3 denotes the 1,024 detector elements provided in those channels 1ch, 2ch ... 1,024ch. The detector elements 3 are connected via their respective resistors to a DC supply and to a ground. Detector currents derived from the individual detector elements 3 are amplified by the preamplifiers 22 and then supplied to the coding circuit 124 to derive the coded signals.

The coding circuit 124 is designed to have the similar arrangement to the coding circuit 24 shown in FIG. 4. Eleven signal lines $129_1$ to $129_{11}$ are provided. When a γ-ray impinges on first detector channel 1ch, the detector signal which has amplified in the amplifier 24 is supplied through a diode $131_1$ to the least significant bit line $129_1$. When it impinges on second detector channel 2ch, the amplified detector signal is supplied through a diode $131_2$ to the adjacent line $129_2$. The above-mentioned signal to detector channel correlation is followed by the remaining signal lines $129_3$ to $129_{11}$. That is, the detector signals are derived as the 11-bit binary coded signal from the coding circuit 124, the coded signals being in the form of parallel digital signals. The anode of the respective diodes $131n$ (indicated by 1, 2, 3 ... 1,024) is connected to the signal lines $129_1$ to $129_{11}$ each end of which is connected via a resistor R to the ground, so that each of the detector signals has own an analogue value corresponding to the value of its detector signal and appears on the corresponding signal line.

To the other ends of the respective signal lines $129_1$ to $129_{11}$, the respective pulse-height analyzer sections $132_1$ through $132_{11}$ of the pulse-height analyzer 130 are connected. The outputs of the pulse-height analyzer sections are connected to an OR gate 133. An input terminal of the OR gate 133 is connected to one input terminal of the respective AND gates $134_1$ to $134_{11}$. The other input terminal of the respective AND gates $134_1$ to $134_{11}$ is directly connected to the signal lines $129_1$ to $129_{11}$.

Since the output of the OR gate 133 is applied to the AND gates $134_1$ to $134_{11}$, the coded signals on the eleven signal lines $129_1$ to $129_{11}$ are AND-gated in the AND gates under the control of the OR gate 133.

In accordance with the third embodiment, the following features exist. The detector signal derived from the semiconductor detector element 3 corresponds to the energy of the incident $\gamma$-ray, i.e., an analogue pulse signal having a pulse height which is proportional to the energy of the incident $\gamma$-ray. The analogue pulse signal is suppled to the coding circuit 124 so that the binary coded signal can be obtained. The coded digital signal is further supplied to the pulse-height analyzer 30 where the scattered ray components are eliminated therefrom, and only the signal having a level greater than the given level is output. The analyzer output is applied to an OR gate 133 to derive the gate signal. The above-mentioned coded signal can be output from the corresponding AND gate 134 to which the gate signal is supplied. Accordingly, since those AND gates $134_1$ to $134_{11}$ are exclusively connected to input ports of the RAM's 35, it is possible to discriminate which AND gate is opened, i.e., the number of the incident $\gamma$-ray channel.

As seen from the circuit diagram shown in FIG. 11, because the preamplifiers 22 are directly followed by the coding circuit 124, instead of by the pulse-height analyzer as in the second embodiment, the number of the pulse-height analyzer sections $132_1$ to $132_{11}$ (eleven sections) can be considerably reduced, as compared with 1,024 sections in the previous embodiment. As a result, various advantages can be obtained, i.e., a lower cost, a simpler circuit, etc. Furthermore, since the coded signals are not directly derived from the pulse-height analyzer sections, but are once gated in the AND gates to be derived from them, no adverse effect can arise from the characteristic fluctuation of the pulse-height analyzer to the analyzed output signal. For example, no bit error occurs in the analyzer output signal, resulting in a detection of the $\gamma$-rays that is highly precise as well as reliable.

While the invention has been described in terms of certain preferred embodiments, and exemplified with respect thereto, those skilled in the art will readily appreciate that various modifications, changes, omissions and substitutions may be made without departing from the spirit of the invention.

Figure 12:
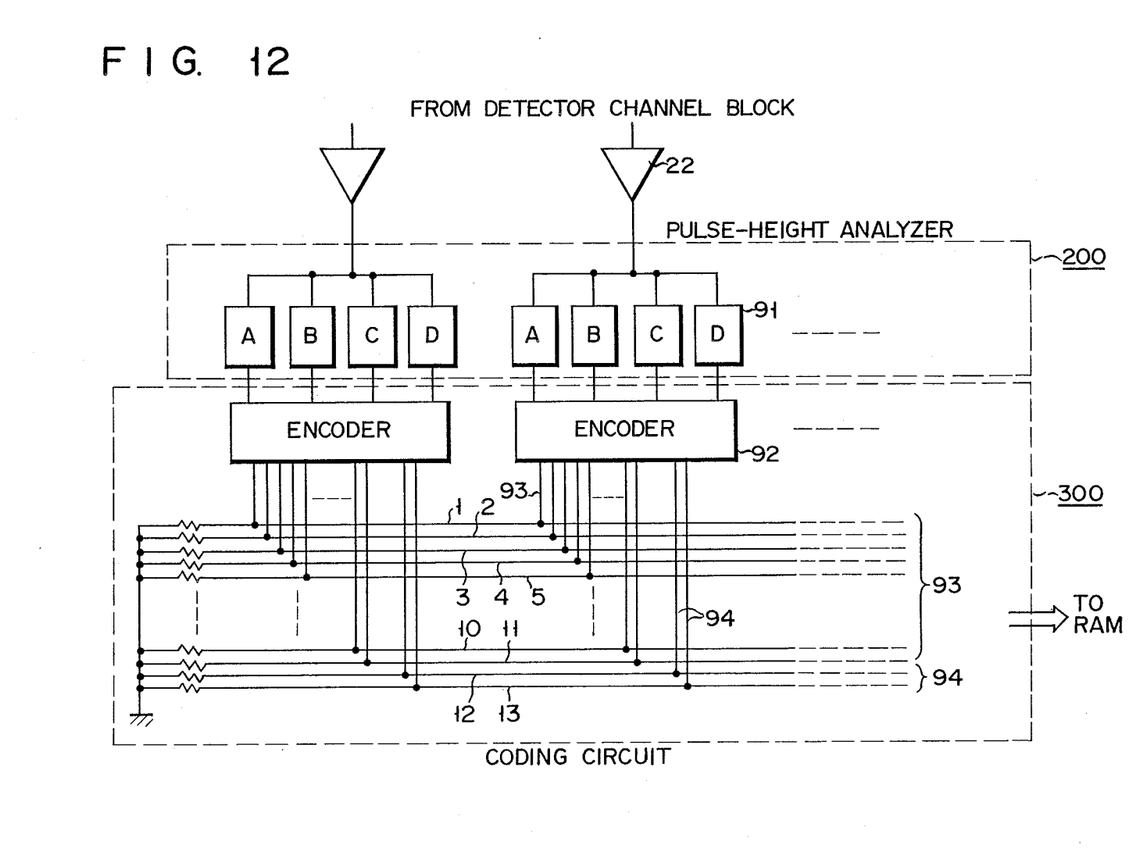
FIG. 12 shows a circuit diagram of a signal process circuit according to another embodiment.

For example it is not limited to select 64 detector subblocks, but more than 64 subblocks can be used. The pulse-height analyzer section 91 of the analyzer 200 is constructed by four analyzer circuits A, B, C and D. These analyzer circuits are the as same as that shown in FIG. 6. However, the threshold voltages, i.e., a value defined by R3/(R3+R4) are different from each other. The threshold voltage of the circuit A is selected to be the largest, with that of the circuit D as the smallest. When the input signal level of the pulse-height analyzer 200 increases gradually, output signals appear from first, the circuit D which has the lowest threshold voltage, to finally the circuit A which has the highest threshold voltage. In other words, the outputs of the pulse-height analyzer circuits are selectively derived, depending upon the energy levels of the incident $\gamma$-rays. The coding circuit 300 shown in FIG. 12 is used for coding the four outputs of those pulse-height analyzer section 91. An encoder 92 follows the four analyzer circuits A, B, C and D. One of functions of the encoder 92 is the same as the coding circuit 29 shown in FIG. 4, and the other function is to derive from the 12th and 13th signals lines coded signals indicating which analyzer circuits are operative. The truth table of the output codes for the 12th and 13th signal lines is shown below.

Truth Table

| A | B | C | D | 12 | 13 |
|---|---|---|---|----|----|
| 0 | 0 | 0 | 1 | 0  | 0  |
| 0 | 0 | 1 | 1 | 0  | 1  |
| 0 | 1 | 1 | 1 | 1  | 0  |
| 1 | 1 | 1 | 1 | 1  | 1  |

In accordance with the modified coding circuit 300, it is possible to simultaneously detect four levels of the photon energy of $\gamma$-rays by merely employing two additional signal lines.

If the difference in the thereshold levels is preset to be very small, it is also possible to homogeneously eliminate the scattered rays over the entire detector region after measuring the characteristic fluctuations of the circuits of the respective detector channels. It is of course possible to employ more than four analyzer circuits.

As has been described in detail, various advantages can be provided with the present invention. For instance, a plurality of detector elements (channels) are arranged in correspondence with the pixels of the incident radiation area, so that no calculation is required for discriminating the detection position. According to one preferred embodiment, those detector elements are electrically sub-grouped in the detector blocks. Then even if more than two $\gamma$-rays are simultaneously incident upon each of the detector block, they can be counted without any problems occuring in the conventional apparatus.

Since the individual detector element is independently operable, the energy conversion efficiency, the photon-collection efficiency and the quantization efficiency can be improved.

Although several detector elements are employed, the circuit arrangements following the detector elements can be manufactured in integrated circuits. Accordingly, such an integration can improve reliability, and reduce size and weight, and provide no adjustment.

As previously described, the respective detector elements are mounted in the corresponding collimators made of lead. In accordance with the invention, the weight of those collimators can be reduced to a half of that of the conventional collimator. As a result, the emission CT apparatus employing such a detector assembly can be easily rotated around the patient.

The semiconductor radiation element is highly reliable and maintenance free.

What is claimed is:

1. A radiation imaging apparatus comprising:
   means for detecting radiation emitted from an object under investigation to which a radioactive substance has been administered, said detecting means including;
   a plurality of detector elements equally divided into a first number of detector subblocks, and
   means for generating electric pulse signals each representing the radiation detected by said detector elements in said detector subblocks;
   a plurality of pulse-height analyzer sections each coupled to a different one of said detector elements in said detector subblocks to analyze said electric pulse signals, said analyzer sections each including means for selecting only those of said electric pulse signals having at least a predetermined signal level;
   means for coding said electric pulse signals selected by said pulse-height analyzer sections and for separately producing coded signals representing unique detection positions in each of said detector subblocks;
   first memory means for temporarily storing said coded signals from said coding means within a predetermined time period into first memory positions, said first memory positions being organized as a matrix array with each corresponding to a different detector subblock;
   second memory means for storing said coded signals from said first memory means in second memory positions organized in accordance with said matrix array, said coded signals in said second memory means representing an image data signal of said object; and
   means for displaying said image data signal as a radiation distribution map.

2. An apparatus as in claim 1, wherein said first memory means includes a first number of random access memories, and
   wherein said second memory means includes a frame memory.

3. An apparatus as in claim 2, further comprising a central processing unit connected between said frame memory and said display means and including means for processing said image data signal so as to improve a quality of said radiation distribution map.

4. An apparatus as in claim 1, further comprising a collimator array having a plurality of collimators arranged in a matrix, each of said collimators corresponding to a different one of said detector elements for reducing scattered radiation.

5. An apparatus as in claim 4, wherein said collimators each include a square frame having a length of 20 mm, a pitch of 2 mm and a thickness of 0.1 mm.

6. An apparatus as in claim 5, wherein each said collimator includes an end portion projecting slightly from an edge of said collimator in a longitudinal direction of the collimator.

7. An apparatus as in claim 1, wherein said first number of said detector subblocks is 64 and wherein 1,024 of said detector elements are in each of said detector subblocks.

8. An apparatus as in claim 1, wherein said detector element is made of a semiconductor material.

9. An apparatus as in claim 1, wherein said detecting means includes a scintillator and a multichannel plate in a vacuum chamber, said multichannel plate being positioned to receive scintillations of said scintillator.

10. An apparatus as in claim 1, wherein said detecting means includes a scintillator and a semiconductor radiation detector in a vacuum chamber, said semiconductor radiation detector being positioned to receive scintillation of said scintillator.

11. An apparatus as in claim 1, wherein said detecting means includes a fluorescent plate, a fiber assembly connected to receive fluorescent light from the fluorescent plate, and a photodiode for converting the fluorescent light of the fluorescent plate into said electric impulses, said fluorescent plate and said fiber assembly being provided in a vacuum chamber.

12. An apparatus as in claim 1, wherein said coding means includes means for connecting said plurality of detector elements belonging to the respective detector subblocks, a preselected number of coding lines to derive said coded signals having digital codes with said preselected number of bits and also analogue levels corresponding to said electric impulses.

13. An apparatus as in claim 1, wherein each said pulse-height analyzer section includes a plurality of pulse-height analyzer circuits having different predetermined levels, and
   wherein said coding means includes a plurality of encoders coupled to said plurality of pulse height analyzer circuits, respectively, by a first preselected number of coding lines, thereby deriving coded signals having position codes of at least a second preselected number of bits and supplementary codes of a third preselected number of bits.

14. A radiation imaging apparatus comprising:
   means for detecting radiation emitted from an object under investigation to which a radioactive substance has been administered, said detecting means including
   a plurality of detector elements equally divided into a first number of detector subblocks, and
   means for generating electric pulse signals each representing the radiation detected by said detector elements in said detector subblocks;
   means for separately coding said electric pulse signals from said plurality of detector elements into coded signals representing unique detection positions in said detector subblocks;
   a plurality of pulse-height analyzer circuit means, connected to said coding means, for selecting only those of said coded signals having a predetermined signal level;
   first memory means for temporarily storing said selected coded signals within a predetermined time period and into predetermined first memory positions organized in a matrix array;
   second memory means for storing said coded signals from said first memory means in predetermined second memory positions organized in accordance with said matrix array, said coded signals stored in said second memory means representing an image data signal of the object; and
   means for displaying said image data signal as a radiation distribution map.

15. An apparatus as in claim 14, wherein said coding means includes first means for connecting detector elements belonging to the respective detector subblocks, via a plurality of diodes, to a preselected number of coding lines so as to derive said coded signals having digital codes of said preselected number of bits and also analogue levels corresponding to said electric impulses.

16. An apparatus as in claim 15, wherein said pulse-height analyzer circuit means includes second means for connecting an output of each said pulse-height analyzer circuits via an OR gate circuit to an input of AND gate circuits, and for connecting an input of said pulse-height analyzer circuit means directly to another input of said AND gate circuits, and wherein said coding lines are coupled to output signals of said AND gate circuits.

17. An apparatus as in claim 14, further comprising a collimator array having a plurality of collimators arranged in a matrix array, each of said collimators corresponding to a different one of said detector elements for reducing scattered radiation.

18. An apparatus as in claim 17, wherein each said collimator of the collimator array includes a square frame having a length of 20 mm, a pitch of 2 mm and a thickness of 0.1 mm.

19. An apparatus as in claim 18, wherein each said collimator includes an end portion projecting slightly from an edge of said collimator in a longitudinal direction of the collimator.

20. An apparatus as in claim 14, wherein said first number of said detector subblocks is 64 and wherein 1,024 of said detector elements are included in each of said detector subblocks.

21. An apparatus as in claim 14, wherein each said detector element is made of a semiconductor material.

22. An apparatus as in claim 14, wherein said detector means includes a scintillator and a multi-channel plate in a vacuum chamber, said multichannel plate being positioned to receive scintillations of said scintillator.

23. An apparatus as in claim 14, wherein said detector means includes a scintillator and a semiconductor radiation detector in a vacuum chamber, said multichannel plate being positioned to receive scintillations of said scintillator.

24. An apparatus as claimed in claim 14, wherein said detector means includes a fluorescent plate, a fiber assembly connected to receive fluorescent light from the fluorescent plate, and a photodiode for converting the fluorescent light of the fluorescent plate into said electric impulses, said fluorescent plate and said fiber assembly being provided in a vacuum chamber.

* * * * *

UNITED STATES PATENT AND TRADEMARK OFFICE
CERTIFICATE OF CORRECTION

PATENT NO. : 4,879,464

DATED : November 07, 1989

INVENTOR(S) : Kazuhiro Iinuma

It is certified that error appears in the above-identified patent and that said Letters Patent is hereby corrected as shown below:

On the Title Page

In the Foreign Application Priority Data, please insert --58-220983-- for Nov. 24, 1983 .....Japan;

Claim 1, Column 13, Line 13, change "including;" to --including--.

Claim 12, Column 14, Line 24, "subblocks" should be followed by --via a plurality of diodes, to--.

Signed and Sealed this

Ninth Day of June, 1992

Attest:

DOUGLAS B. COMER

Attesting Officer

Acting Commissioner of Patents and Trademarks